United States Patent
Adams (10) Patent No.: US 11,045,880 B2
(45) Date of Patent: Jun. 29, 2021

(54) BORING TOOL

(71) Applicant: Gary Richard Adams, Camp Hill QLD (AU)

(72) Inventor: Gary Richard Adams, Camp Hill QLD (AU)

(*) Notice: Subject to any disclaimer, the term of this patent is extended or adjusted under 35 U.S.C. 154(b) by 0 days.

(21) Appl. No.: 16/628,138

(22) PCT Filed: Jul. 11, 2018

(86) PCT No.: PCT/AU2018/050716
§ 371 (c)(1),
(2) Date: Jan. 2, 2020

(87) PCT Pub. No.: WO2019/010532
PCT Pub. Date: Jan. 17, 2019

(65) Prior Publication Data
US 2020/0222991 A1 Jul. 16, 2020

(30) Foreign Application Priority Data

Jul. 12, 2017 (AU) .............................. 2017902743

(51) Int. Cl.
| B23B 29/034 | (2006.01) |
| B23B 27/10 | (2006.01) |
| B23B 29/02 | (2006.01) |

(52) U.S. Cl.
CPC .. *B23B 29/03457* (2013.01); *B23B 29/03407* (2013.01); *B23B 27/10* (2013.01);
(Continued)

(58) Field of Classification Search
CPC . B23B 29/03; B23B 29/034; B23B 29/03403; B23B 29/03407;
(Continued)

(56) References Cited

U.S. PATENT DOCUMENTS

| 48,819 A | * | 7/1865 | Marshall | ................. E21B 10/32 |
| | | | | 175/263 |
| 165,787 A | * | 7/1875 | Bullock | ................. E21B 10/32 |
| | | | | 175/272 |

(Continued)

FOREIGN PATENT DOCUMENTS

| CN | 102380630 | 3/2012 |
| JP | 2009208100 | 9/2009 |

OTHER PUBLICATIONS

"DEFA Product documentation: Full Catalog" published on May 2018, Retrieved from https://www.heule.comlen/chamfering-tool/defa on the Apr. 4, 2020, pp. 106-122.
(Continued)

*Primary Examiner* — Alan Snyder
*Assistant Examiner* — Yasir A Diab
(74) *Attorney, Agent, or Firm* — Grossman Tucker Perreault & Pfleger PLLC (57) ABSTRACT

There is provided a undercutting boring tool (10) comprising a bar body (11). A lost motion link consists of a spring (26) selectively compressed by a lost motion rod (27) having a lost motion slot (33) spaced from a drive pin (34). An operating rod portion (36) has a trunnion body (37) at its front end having a pin (41) adapted to engage the lost motion slot (33). A tool carrier (42) forms a pair of spaced flat tines (43) and forms a bearing surface (44) in the bight. The upper tine (43) and the bearing surface (44) section are slotted at (45) to allow the passage of a control link (46). Apertures (47) in the tines (43) engage pins (50) on the trunnion body (37). The bar of a generally H-shaped tool assembly (52) comprises a bearing surface (53) running in the bearing surface (44). A crank portion (54) is connected to the control link (46) via crank pin (55). Drive pins (61) and (62) engage the tool assembly (52) with the end face of the bar body (11) providing positive engagement resisting rotational forces in
(Continued)

use. The arrangement allows for post-insertion rotation of the tool assembly (52) from an aligned to a transverse (working) position before engagement of the drive pins (61) and (62).

23 Claims, 10 Drawing Sheets (52) U.S. Cl.
CPC ......... *B23B 29/02* (2013.01); *B23B 29/03421* (2013.01); *B23B 2250/12* (2013.01); *B23B 2270/025* (2013.01); *B23B 2270/24* (2013.01)

(58) Field of Classification Search
CPC ........ B23B 29/03417; B23B 29/03421; B23B 29/03428; B23B 29/03435; B23B 29/03446; B23B 29/03457; B23B 29/03478; B23B 29/02; B23B 27/10; B23B 2250/12; B23B 2270/025; B23B 2270/24; B23B 51/0045; B23B 51/0018; B23B 51/0027; E21B 10/32
See application file for complete search history.

(56) References Cited

U.S. PATENT DOCUMENTS

| | | | | |
|---|---|---|---|---|
| 473,909 A * | 5/1892 | Bullock | ................ | E21B 10/32 175/286 |
| 963,596 A * | 7/1910 | Lescure | ................ | B23B 51/102 408/159 |
| 1,045,670 A * | 11/1912 | Buck et al. | ............. | E21B 10/32 175/286 |
| 1,460,427 A | 7/1923 | Mills | | |
| 2,378,830 A * | 6/1945 | Chaddock | .............. | B27G 15/00 408/152 |
| 2,404,027 A * | 7/1946 | Belanger | ................ | B23B 51/102 408/159 |
| 2,663,203 A * | 12/1953 | Fried | ..................... | B23B 51/102 408/154 |
| 2,705,129 A * | 3/1955 | Menton | ................... | E21B 10/34 175/263 |
| 2,832,568 A * | 4/1958 | Kammerer, Jr. | ...... | E21B 10/322 175/286 |
| 3,575,245 A * | 4/1971 | Cordary | ................ | E21B 10/345 175/268 |
| 3,806,271 A * | 4/1974 | Ishiguro | ................ | B23B 51/102 408/159 |
| 3,827,821 A * | 8/1974 | Swenson | ............... | B23B 51/102 408/59 |
| 5,141,063 A * | 8/1992 | Quesenbury | .......... | E21B 10/322 175/267 |
| 5,927,911 A * | 7/1999 | Steiner | .................. | B23B 51/102 408/159 |
| 8,678,721 B2 | 3/2014 | Shozda | | |
| 9,120,163 B2 * | 9/2015 | Studer | ................... | B23B 51/102 |
| 2004/0028489 A1 | 2/2004 | Brock et al. | | |
| 2007/0102195 A1* | 5/2007 | Denoix | ................... | E21B 10/32 175/91 |
| 2010/0014933 A1* | 1/2010 | Nedzlek | ................ | B23B 51/102 408/156 |
| 2013/0149058 A1* | 6/2013 | Kelly | ..................... | E21B 10/32 408/147 |

OTHER PUBLICATIONS

Internatioal Search Report and Written Opinion dated Sep. 21, 2018, issued in PCT Patent Application PCT/AU2018/050716, 8 pages.
Preliminary Report on Patentability dated Jan. 23, 2020, issued in PCT Patent Application PCT/AU2018/050716, 6 pages.

* cited by examiner

BORING TOOL

FIELD OF THE INVENTION

This invention relates to a boring tool. This invention has particular application to a boring tool having for use in undercutting applications such as boring a larger diameter bore in a body though a smaller diameter access, and for illustrative purposes the invention will be described with reference to this application. However, we envisage that this invention may find use in other applications such as back counterboring, back spot facing, back chamfering or the like.

BACKGROUND OF THE INVENTION

The reference to any prior art in this specification is not, and should not be taken as, an acknowledgement or any form of suggestion that the referenced prior art forms part of the common general knowledge in Australia.

There are several lathe or mill applications where an internal bore must be formed of larger diameter than the bore providing access to it. Up to certain diameters and applications, the complexity of such bore forming is avoided by selecting a tube of the final bore size and swaging or forging the ends to produce the reduced-bore portion or portions. For example, rigging screw barrels comprise a tube with opposite hand thread either end, and a relieving bore of larger diameter between them. Produced in volume they are typically, a tube formed or forged at the end (swaging them down to a reduced size), leaving them with a bore that will accept a thread and clearance within the central portion. They are very cheap in small sizes but from 20 mmØ and larger become progressively more expensive. Above 36 mmØ, rigging screw barrels are rarely seen in the forged or swaged form.

At the larger sizes the enlarged bore is provided by tool undercutting. The relieving undercut is the costliest feature to produce. The depth of penetration requires the use of tooling of large overhang such as a boring bar. To pass into the space to be bored, the boring bar must necessarily have a deployable cutting tip. Tools with overhangs of greater than 4 tool diameters and more especially greater than 10 tool diameters suffer from vibration.

The usual cause of vibrations during machining is the dynamic interaction between the cutting process and the machine tool structure. The source is the variation of cutting force generated between the tool and workpiece. This force strains the structure elastically and can cause a deflection of the tool and workpiece, which alters the tool-work engagement. A disturbance in the cutting process causes a typical deflection which then alters the cutting force. This may then cause the initial vibration to be self-sustaining and to build up with the machine oscillating in one of its natural modes of vibration.

To achieve sufficient process stability, the metal removal rate is often reduced, or the cutting tool changed, with a reduction in productivity. The use of damped boring bars, with damping elements integrated in the boring bars, improves the dynamic behaviour of the tools, making the process more stable.

Generally, machining up to four times the diameter of boring bars does not cause vibration problems. With an overhang of more than 4 times the tool diameter, vibration tendencies can become more apparent and damped bars may be a solution. With a pre-tuned boring bar, machining of holes with a depth of up to 14 times the diameter of the bar can be performed with good results.

An increased length from 4 to 10 times the bar diameter will give 16 times larger deflection for a bar being subjected to the same cutting force. A further extension from 10 to 12 times the bar diameter, gives another 70% increase in deflection from the same cutting force. Holding the bar length constant while changing the bar diameter from 25 to 32 mm, reduces deflection by 62% for equal cutting forces.

Damped boring bars include tools that are pre-tuned to the correct frequency in relation to the tool length. This basically means setting up the damped boring bar and the machine to be set up the same as a conventional, solid boring bar. The pre-tuning system of the damped bar consists mainly of a heavy, axial tuning body with a certain inertia mass, suspended in an axial cavity of a hollow tool bar in two spaced rubber bushes, one at each end of the tuning body. The tuning body and the hollow space is filled with a liquid oil. If vibration tendencies should arise during the machining process using a damped bar, the dampening system will immediately come into force, and the movement-energy of the bar will be absorbed into the tuning system. As a result, vibration is minimized, and machining performance maintained or improved.

One method for producing the undercut in rigging screws has been to use such antivibration boring bars of the single point type, in a lathe situation. In a single point boring bar an operating rod may impinge on a camming surface of a cutting element mounted on a pivot lying in a transverse plane to the bar axis. The rod and a spring are opposed to move the cutting element from a stowed position to a deployed position against spring loading. The stowed position has the cutter element laying in a slot milled in the bar side wall, enabling the bar to be inserted through a hole close to the bar diameter in size. On insertion, the cutter element is deployed in a pre-milled starter cavity in the workpiece. The workpiece is turned and advanced onto the cutter to extend the starter cavity.

This tool has much in common with single-point back boring tools such as that disclosed in CN 102380630 A.

Multiple passes are required with small cut depths and process reliability is average, often deflection of the bar causes size drift requiring rework. This is a direct consequence of the asymmetry of the working loads imposed by the single point cutter. However, at the scale of the pieces it is impractical to duplicate the cutters for any reasonable ratio of the original internal diameter to the finished internal diameter. Also, antivibration bars are expensive, with one for a 24 mm barrel being A$1700.

There are many examples of symmetric or balanced-cutting bar tools having deployable cutters. Examples include honing and/or bore machining tool heads such as those described in JP 2009-208100A and expanding fly cutters such as described in U.S. Pat. No. 1,460,427.

Cutting fluids are an essential component of machining processes and the requirement to supply a suitable flow of cutting fluid to the cutter places a further limitation on prior art designs.

In summary, symmetrically deployed overboring tools are limited in the bar bore to overbore ratio because of geometrical constraints, and single cutter boring bars (even antivibration bars) suffer from asymmetric loading-induced inaccuracy. A problem to be solved is having a large overbore to bar diameter ratio and having a cutter assembly physically strong enough to be rotated relative to the work, while avoiding asymmetric loading and maintaining sufficient cooling and lubrication.

SUMMARY OF THE INVENTION

In one aspect, the present invention resides broadly in a boring tool including:
- a tool bar extending along a long axis;
- a tool carrier mounted at a tool mounting end of said tool bar and movable by an operating rod extending along said tool bar;
- a cutting tool pivoted to said tool carrier about a mounting axis transverse said long axis and comprising at least a pair of arm portions each extending symmetrically away from said mounting axis to respective cutter portions;
- a crank connected to and moving said cutting tool between a deployed position having said cutter portions located substantially symmetric about said long axis and a stowed position having said cutter portions laying in a plane substantially aligned with said long axis;
- a complementary lug and recess associated with the cutting tool when in said deployed position and an end face of said tool mounting end and selectively engageable by said movement of said tool carrier, said crank being operable by said operating rod via a lost motion link selected to force cutting tool stowing only after lug and recess disengagement.

The tool bar may be a tool bar fixed in position on, for example, a lathe, and adapted to have a workpiece rotated about it. Alternatively, the tool bar may be the rotating part. In the context of the use of a fixed mounting for the tool bar, the tool bar is preferably adapted to be mounted concentric with a dead centre of the lathe. This ensures engagement of both or all cutter portions with the work. In the case of boring rigging screw barrels, the tool is indexed with the lather live centre mounting the rotating workpiece. The tool bar may be made of water, air or oil-hardened tool steel.

The tool bar has a long axis and is accordingly elongate. The length of the toolbar will be determined having regard to the depth of penetration into the workpiece that is required. The toolbar may be of a round or polygonal section.

The tool bar may be provided with means to supply coolant and/or lubricant to the cutting tool. Hereinafter, such fluids are collectively termed "cutting fluids". Accordingly, the tool bar may include a longitudinal passage for delivering cutting fluid to the tool mounting end of the tool bar.

The tool carrier preferably has a maximum cross section which lies within the cross section of the tool bar to minimize the insertion bore size required in the workpiece. The tool carrier may be supported symmetrically about the tool bar long axis. For example, the tool carrier may comprise a generally fork-shaped, spring steel body having a pair of opposed, flat tines adapted to slidingly engage a pair of opposed complementary grooves milled into the side of the tool bar and extending from the mounting end. The bight of the fork shaped body may be milled or formed to provide a bushing surface for pivotally mounting the cutting tool. The tines may be sprung apart to fit a pivot pin portion of the cutting tool as described hereinafter.

The operating rod may engage the tool carrier by any suitable means. For example, the operating rod may lay in a channel milled into the outer cylindrical wall or a side face of the tool bar and extending parallel to the long axis. Alternatively, the operating rod may pass through a bore provided in the tool bar. The operating rod may be pinned or set screwed to the tool carrier. In the case of the fork-like tool carrier described above, the operating rod may terminate in a block or coupling adapted to slide in a channel milled through the floor of each of the complementary grooves, the block or coupling having pins or threaded apertures respectively. The pins may be adapted to be engaged by corresponding apertures in the flat tines and retained therein by the spring closure of the tines. Threaded apertures may accept e.g. CSK metal threads to secure the flat tines to the coupler. The operating rod may be secured in the deployed position by any suitable means including but not limited to a thumb wheel or the like engaging a threaded end of the operating rod and reacting against an inner end of the tool bar. Other methods will become apparent from the description of alternative embodiments.

The cutting tool may comprise an essentially bifurcated cutting tool body portion and having the transverse-axis pivot to the tool carrier located at the bifurcation. It is envisaged that the pivot of the cutting tool body to the tool carrier may take one of several forms. For example, the pivot may comprise a slotted ball joint arrangement or the like. Alternatively, the cutting tool may include a plain bearing surface at the bifurcation of the cutting tool body portion and adapted to rotate relative to a complementary plain bearing portion of the tool carrier. As described above the complementary bearing portion may be milled or formed into the bight of a fork-like tool carrier.

The at least a pair of arm portions each extending symmetrically away from said mounting axis to respective cutter portions may comprise a single arm disposed at each of opposite ends of the pivot arrangement. Alternatively, the cutting body portion may comprise a substantially H-shaped body portion, where the bar of the H-shape comprises the transverse pivot arrangement and the arms of the H-shape form two respective, diametrically-opposed pairs of arms. Advantageously, the dimension of the H-shaped cutting tool along the transverse axis is less than or as close as possible to less than a notional diameter of the tool bar, to minimize the size of the entry bore into the work piece.

The cutting tool may have integral cutting portions or cutting insert portions secured by conventionally by screws (e.g. CSK metal threads), silver solder or other cementing means. The cutting portions may be adapted for honing, machining or boring, depending on the application. In certain ° embodiments, the cutting portions may be configured for counterboring, back chamfering, back spot facing, honing, machining or undercut boring.

In the case of H-shaped cutting tools, one opposed pair of arms may include primary cutting portions while the other pair are slightly offset to provide stability without cutting. The stability pair may also comprise hard inserts secured by screws, silver solder or other cementing means. In other embodiments, a lead pair may perform a first cut at a first diameter while a secondary pair cuts to finished dimension of the bore. In yet further embodiments a diametrically opposed pair may comprise a single cutting portion which may be paired with a stabilizing portion. The stabilizing portion may be located and sized to be either trailing the single cutting portion in the cut bore or leading it in the pilot bore. If trailing, the stabilizing portion may be spaced from the cut by at least a selected maximum axial advance-per-revolution.

The H-shaped cutting tools may be configured to be a chamfer cutter where the stabilizing inserts bear on the pilot bore ahead of the cutting inserts. This configuration can front and back counterbore (leaving a 45° face), front and back chamfer, and extend a preformed chamber. Alternatively, the H-shaped cutting tools may be configured as a bore H-cutter, where the stabilizing inserts bear on the bore produced by the cutting inserts. This configuration can front counterbore (leaving a 10° face) and extend a preformed chamber. This configuration has deeper cut and metal removal advantages in the right application.

The crank connected to and moving the cutting tool between a deployed position and a stowed position is clearly rotating the cutting tool about the transverse axis and, as such must include a crank pin substantially parallel to the transverse axis and spaced from it. In the case of the preferred tool carriers symmetrically disposed and supported on the tool bar on flat tines, the crank preferably operates through a longitudinal slot provided through one of the tines, thus permitting connection of the crank to a lost motion link.

The complementary lug and recess may comprise a shaped spigot associated with a rear face of the cutting tool in the deployed position and a complementary shaped recess in the end face of the tool mounting end. In view of the significant milling of the tool mounting end to accommodate the operating rod, tool carrier and lost motion link, it has been found advantageous to provide at least one steel locating stud adapted to locate in a complementary locating aperture, the stud and aperture being as far as is practicable from the axial centreline of the tool bar. It is particularly advantageous the have a spaced pair of locating stud and aperture arrangements. It has been found even more advantageous to have at least one of the studs have a fluid passage therethrough communicating with the cutting fluid system to convey cutting fluid to passages in the cutting tool and thence to the cutting portions.

To prevent the cutting tool from jamming on the complementary lug and recess by rotation toward the stowed position, while using the same operating rod, the present apparatus links the tool carrier movement to the crank via the lost motion link, allowing cutting tool deployment before lug and recess engagement. The lost motion link may comprise a slide having a longitudinal slot in which a lug associated with the operating rod works, and a transverse pivot joint to the crank. The slide is preferably spring biased toward the stowed position. When the slide reaches a forward stop, the crank is anchored, the operating rod lug migrates along the longitudinal slot in lost motion, and the tool holder causes the cutting tool to effectively rotate about the crank pin to stow.

In this arrangement, with the tool carrier forward and the cutter tool stowed under spring pressure acting on the slide, the tool can be inserted into the pilot bore into an expanded starter chamber. The first immediate effect of withdrawing the operating rod is to simultaneously move the tool carrier and slide, thus allowing the crank to rotate the cutting tool to the deployed position and start compressing the spring. When the tool is in the deployed position and cannot rotate further, continuing withdrawal of the operating rod brings the tool assembly back until the lug and recess engages. The operating rod may then be locked off and the tool is ready for boring.

After the chamber has been extended by boring to the required depth, the tool must be removed. To effect this, the dismounted tool bar has the operating rod freed from locking. The operating rod advances the tool carrier until the lug and recess release. Thereafter the slide reaches the end of its travel, locking the crank. Further forward motion of the tool carrier advances the cutting tool pivot past the crank pin, rotating the cutting tool to the stowed position. The tool may now be withdrawn through the initial pilot hole.

An alternative rotatable boring tool, e.g. for a computerized machine, may be hydraulically operated by the cutting fluid. For example, the tool bar may be fixed to one end of a cylinder, the other end of cylinder being mounted for rotation in the machine by a spigot. The operating rod may be secured to and operable by a piston in the cylinder, the piston being biased to operate the operating rod to move said cutting tool toward the stowed position, such as by an axial spring. The cutting fluid may be supplied under pressure from said machine via the spigot to the face of the piston to oppose the bias and move the operating rod to move the cutting tool toward the deployed position. The pressure on the piston is in effect a steady-state back pressure from the cutting tool end where it is used for lubrication and clearance.

In a yet further embodiment of a rotating tool, such as a boring tool for use in e.g. a vertical manual milling machine, the tool bar may be mounted to a chuck adapter for rotation in the collet chuck of the milling machine. The chuck adapter may have an axial bore and a pair of opposed longitudinal slots through the side wall thereof. The axial bore may contain a spring or other biasing means and adapted to bear on a spring follower or the like secured to the end of the operating rod. The follower or the like may be made captive by a pin or the like, extending transversely through the follower and the longitudinal slots and serving to bias the cutting tool to the stowed position. The chuck adapter may have a threaded outer surface on which may be screwed a clamp nut or the like adapted to be rotated, such as by hand, to bear on the ends of the pin to effect compression of the spring and bias the cutting tool to the deployed position.

In a further aspect the present invention resides broadly in A method of boring a workpiece mounted by one end for rotation on a live centre of a lathe and having a pilot bore therethrough and an expanded starter chamber formed in said pilot bore adjacent the other end thereof, and comprising the steps of:

providing a tool according to the foregoing description in the stowed configuration;
clamping the tool in a lathe tool post
inserting the tool through the pilot bore in to the expanded starter chamber;
operating the operating rod causing the crank to rotate the cutting tool to the deployed position in the starter chamber and bring the cutting tool assembly back until the lug and recess engage;
locking off the operating rod;
operating the lathe and advancing the tool post to bore the workpiece;
stopping the lathe;
backing off the tool post to partially withdraw the tool;
unlocking the operating rod;
advancing the operating rod until the lug and recess release and the tool carrier advances the cutting tool pivot past the crank pin, rotating the cutting tool to the stowed position; and
withdrawing the tool through the pilot bore.

BRIEF DESCRIPTION OF THE DRAWINGS

The invention will be described with reference to the following non-limiting embodiment of the invention as illustrated in the drawings and wherein.

In the figures there is provided a boring tool (generally indicated as 10) built up on nitride heat treatable, medium carbon steel boring bar body 11 having a particular series of millings and borings. A receiver portion 12 is milled transversely through the bar body 11 for a distance spaced from a front face 13 of the bar body 11. An axial operating rod bore 14 passes from a mounting rear end 18 to intersect the receiver portion 12 milling. Parallel to the bar axis and spaced from the operating rod bore 14 is a lost motion link assembly bore 15 drilled from the front face 13 to a blind end 16.

On the other side of the bar 11 a coolant passage 17 has a narrow portion 20 in the region of the receiver portion 12, drilled from the front face 13 and intersecting an end of a larger bore portion 21 drilled from the mounting end 18. A transverse drilling 19 manifolds the boring bar body 11 to a coolant supply, the bore portion 21 being occluded at the mounting end by interference fit plug 22. The narrow portion 20 of the coolant passage 17 is counterbored from the front face at 23 for reasons that will be described hereinafter.

The front face is relieved back to the receiver portion 12 either side of a plane containing the axes of the bar 11, coolant passage 17 and lost motion link assembly bore 15 to present a generally figure-8 longitudinal section with a bore 17, 15 presented at each lobe at the face 13 and a relatively narrow waist portion 24.

A pair of tool carrier sliding mount portions 25 are milled into the bar body 11 side wall and extending up the bar toward the mounting end 18.

A lost motion link assembly consists of a spring 26 located in the bore 15 and selectively compressed by a lost motion rod 27 co-located in the bore 15. The lost motion rod 27 is limited in its relaxed location by a plug 30 retained in the bore 15 behind the front face 13 by a pin 31 intersecting the plug 30 through transverse drilling 32. A lost motion slot 33 is milled along the side of the lost motion rod 27 and is spaced from a co-linear positive drive pin 34.

An operating rod assembly 35 comprises an operating rod portion 36 passing though the rod bore 14 and having a threaded connection to a trunnion body 37 at its front end and a further threaded engagement with a thumb wheel 40 at its back end. The trunnion body 37 has a first drive pin 41 adapted to engage the lost motion slot 33.

A tool carrier 42 is formed from spring steel by bending to form a pair of spaced, relatively wide flat tines 43 adapted to slidingly mount to respective sliding mount portions 25 and separated by a relatively narrower circular section forming an inner plain bearing surface 44. The relatively upper flat tine 43 and the circular section are longitudinally slotted at 45 to allow the passage of a control link 46 described in more detail hereinafter. A pair of opposed apertures 47 in the respective flat tines are adapted to engage corresponding opposed tool advancing pins 50 forming part of the trunnion body 37. The spring steel tool carrier 42 may be tempered after milling and forming, the bearing surface 44 ground and post-hardened as required.

The control link 46 locates in the slot 45 and engages the positive drive pin 34 via aperture 51, thereby creating a lost motion relation between the tool carrier 42 and the control link 46 on operation of the operating rod assembly 35.

A generally H-shaped tool assembly 52 has a relatively longer axis transverse the bar of the H and a relatively shorter axis along the bar of the H. The bar of the H comprises a substantially cylindrical bearing surface 53 adapted to bear on the corresponding bearing surface 44 of the tool carrier 42 to which the tool assembly is assembled before fitting off to the bar body 11. An upper portion of the bearing surface 53 is slotted transversely at 48 to allow for the control link 46 under circumstances that will become apparent. At each end of the cylindrical bearing there is provided an integral crank portion 54 adapted to be secured to the front end of the control link 46 via crank pin 55. By this means the tool assembly 52 may be rotated from a position with its long axis aligned with the bar axis to a position with its long axis transverse the bar axis.

Figure 1:
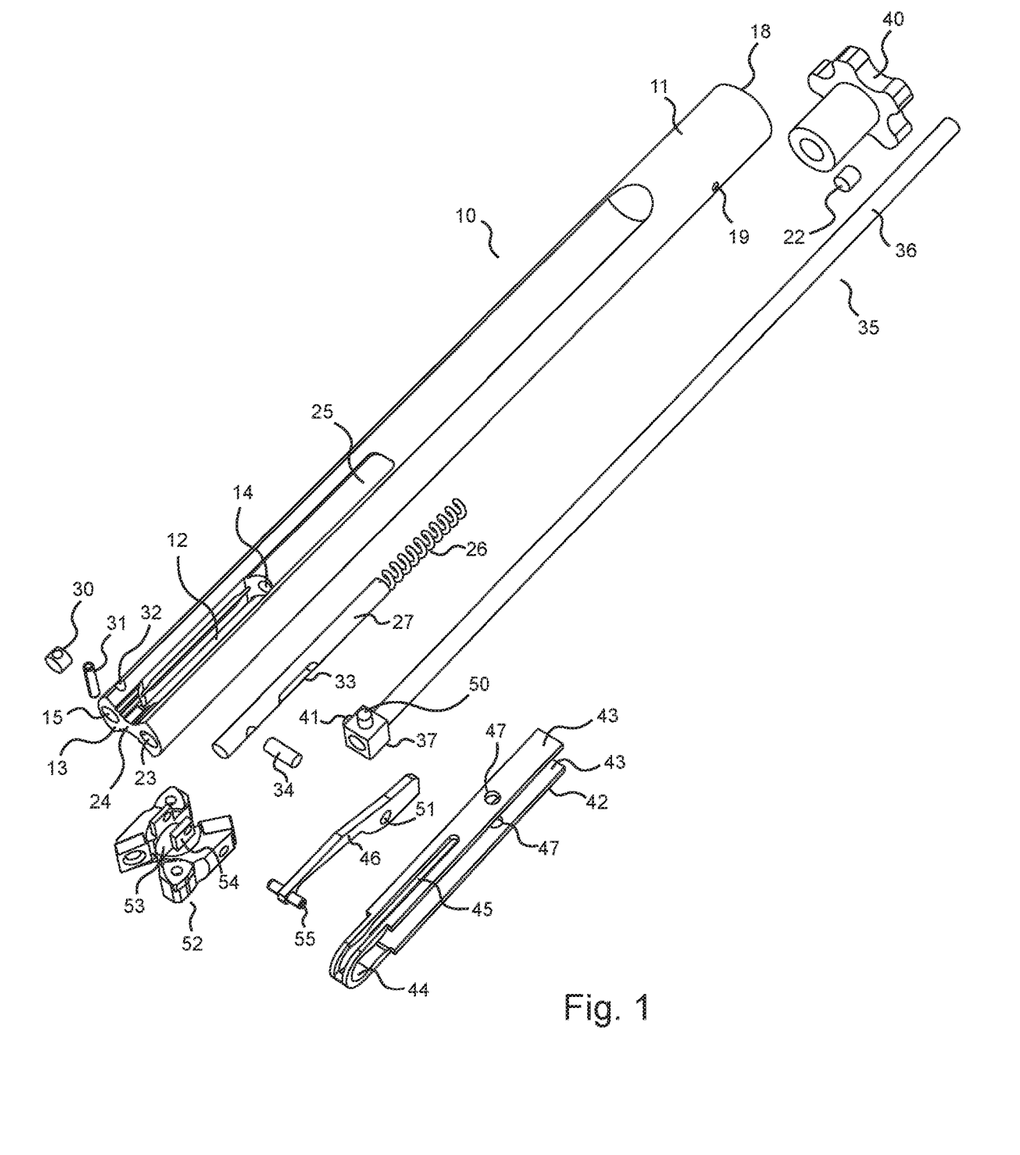
FIG. 1 is an exploded isometric view of a boring tool in accordance with the present invention.
Figure 2:
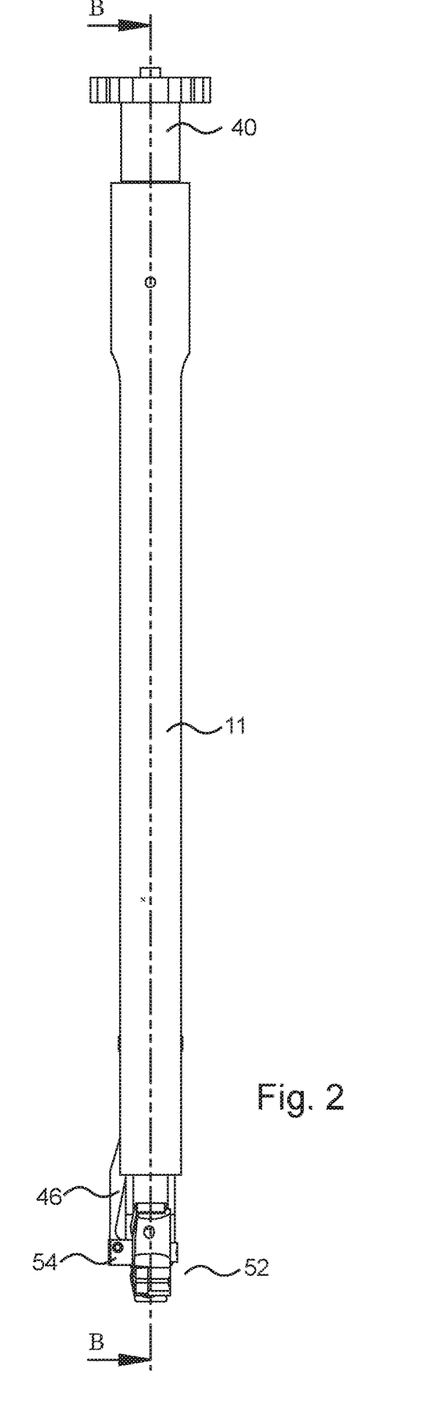
FIG. 2 is a first side view of the apparatus of FIG. 1, operatively stowed.
Figure 3:
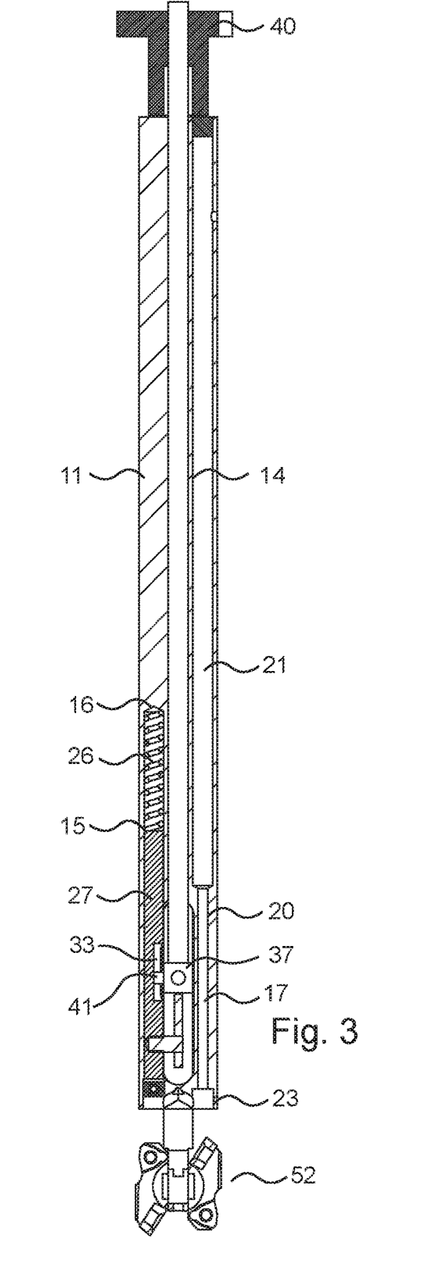
FIG. 3 is a section view of the apparatus of FIG. 1, along the section B-B of FIG. 2.
Figure 4:
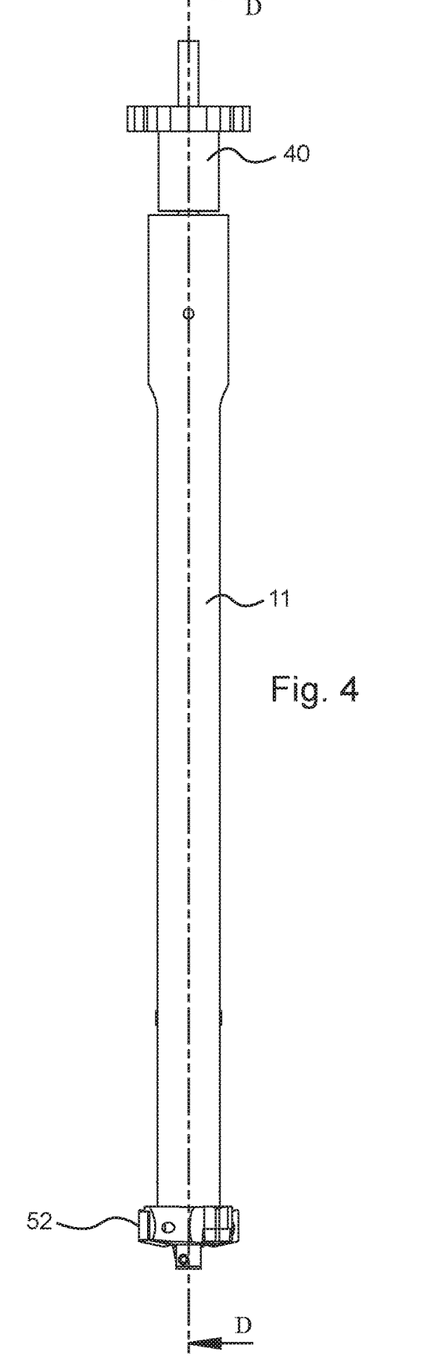
FIG. 4 is a second side view of the apparatus of FIG. 1, operatively deployed.
Figure 5:
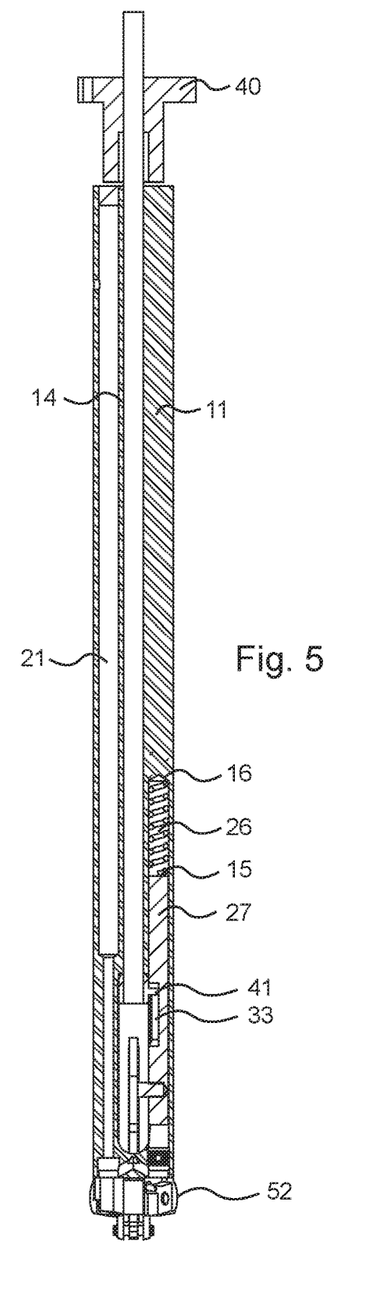
FIG. 5 is a section view of the apparatus of FIG. 1, along the section D-D of FIG. 4.
Figure 6:
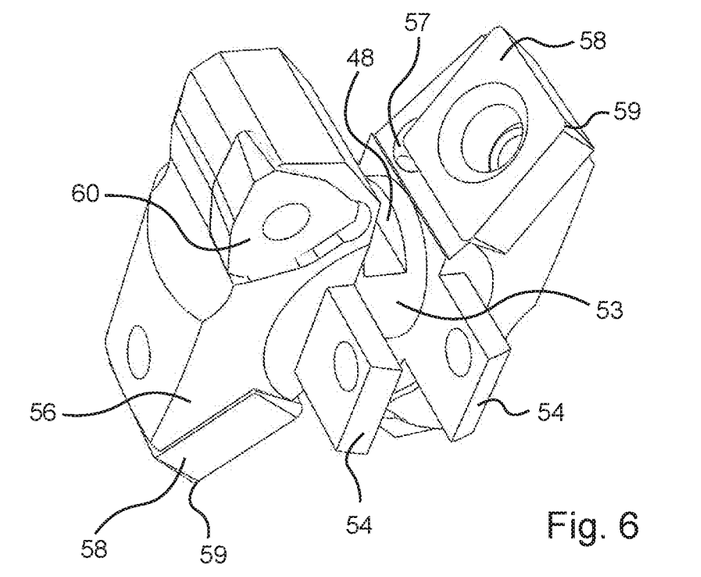
FIG. 6 is a front perspective detail of a cutter assembly of the apparatus of FIG. 1.
Figure 7:
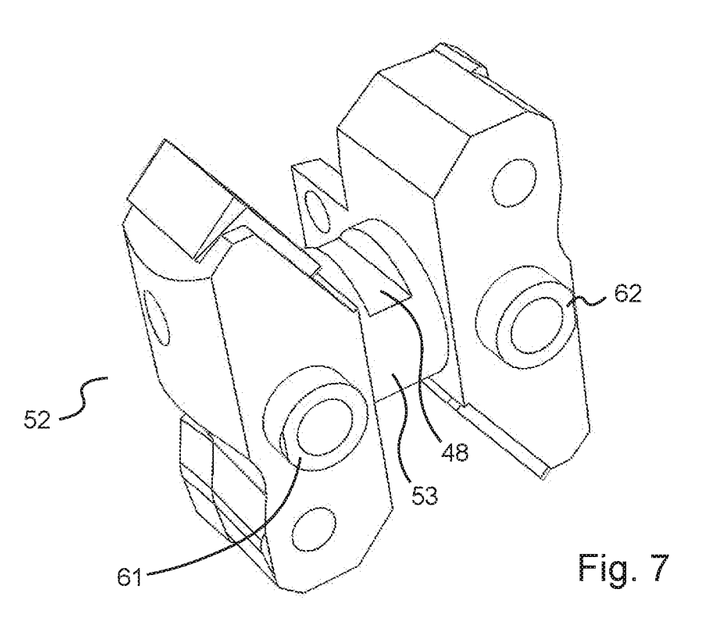
FIG. 7 is a rear perspective view of the cutter assembly of FIG. 6.

The tool assembly 52 (as best illustrated in FIGS. 6 and 7) comprises a generally H-shaped cutter body 56 including the integral cylindrical bearing surface 53 and integral crank portions 54. Each of the "arms" of the H-shaped cutter body 56 form one of a diagonal pair of insert mounts, one pair being relieved to mount carbide cutting inserts 58 secured by Torx screw (omitted for clarity) and the other pair being relieved to mount carbide centring (non-cutting) inserts 60. Hollow drive pins 61 and 62 are adapted to engage the coolant passage counterbore 23 and bore 15 respectively at the front face 13 to secure the tool assembly against relative rotation to the tool bar body 11. The hollow drive pin 61 communicates with passages in the cutter body 56 to supply cutting fluid to the work through ports such as at 57.

The operation of the embodiment to deployment is based on two sequential steps, the first being rotation of the tool assembly 52 from a position with its long axis aligned with the bar axis to a position with its long axis transverse the bar axis, followed by axial engagement of the tool assembly 52 with the front face 13, the hollow drive pins 61 and 62 providing positive engagement resisting rotational forces in use.

The stages of the deployment operation may be described with reference to the tool carrier 42 being drawn rearward by operation of the operating rod assembly 35. This initial rearward motion is accompanied by travel of the trunnion pin 41 rearward along the lost motion slot 33, meaning in turn that the control link 46 remains for the present static. As the tool assembly 52 is drawn back by the tool carrier 42, the crank portions 54 are acted on by the crank pin 55 held static by the control link 46, to rotate the tool assembly 52 into its deployed orientation, that is, with its long axis transverse the bar axis. The geometry of the crank and the slot 48 relieved into the bearing surface 53 cooperate to allow a complete 90° rotation by parking the shank of the control link 46 in the slot 48.

After the tool assembly 52 is rotated, the trunnion pin 41 is fully rearward in the lost motion slot 33. Further withdrawal of the operating rod assembly 35 by turning the thumb wheel 40 results in concurrent rearward motion of both the tool carrier 42 and the lost motion rod 27, which in turn draws the control link 46 via pin 34. This compresses the spring 26, which ensures that the tool assembly 52 is "normally disengaged" from the front face 13 in the absence of positive operation of the operating rod assembly 35. This ensures that the transverse orientation of the tool assembly 52 is maintained while the tool assembly 52 is drawn into engaged contact with the front face 13 with the hollow drive pins 61 and 62 providing the positive engagement. The tool assembly 52 is now secured in position with cutting tips 59 describing an arc of rotation of significantly larger diameter (in this case, 23 mm) than the boring bar notional diameter (in this case, 17 mm).

Figure 8:
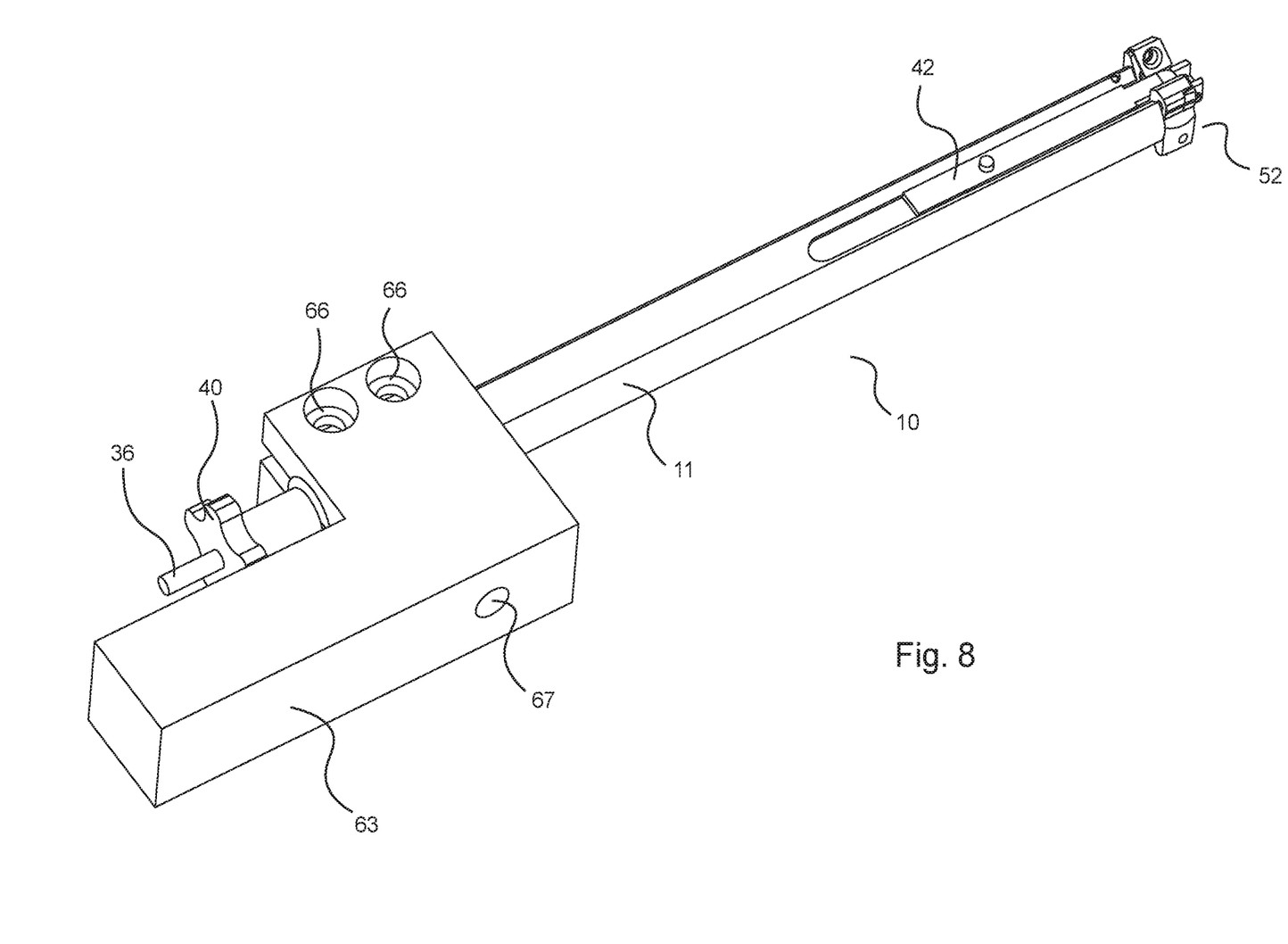
FIG. 8 is a perspective view of the mounted boring tool of FIG. 1.
Figure 9:
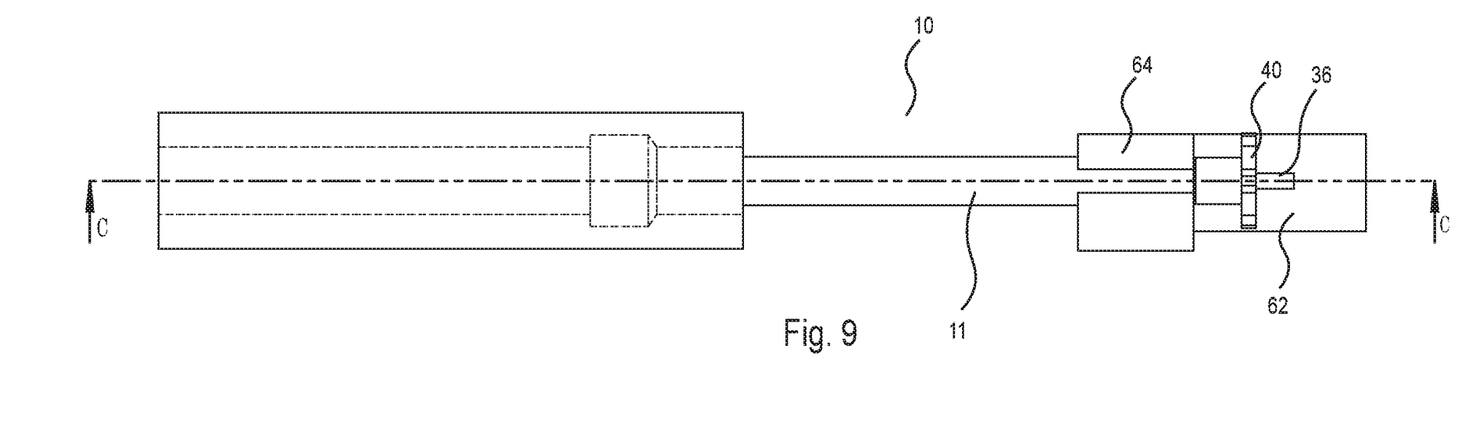
FIG. 9 is a detail top view of the mounted boring tool of FIG. 1.
Figure 10:
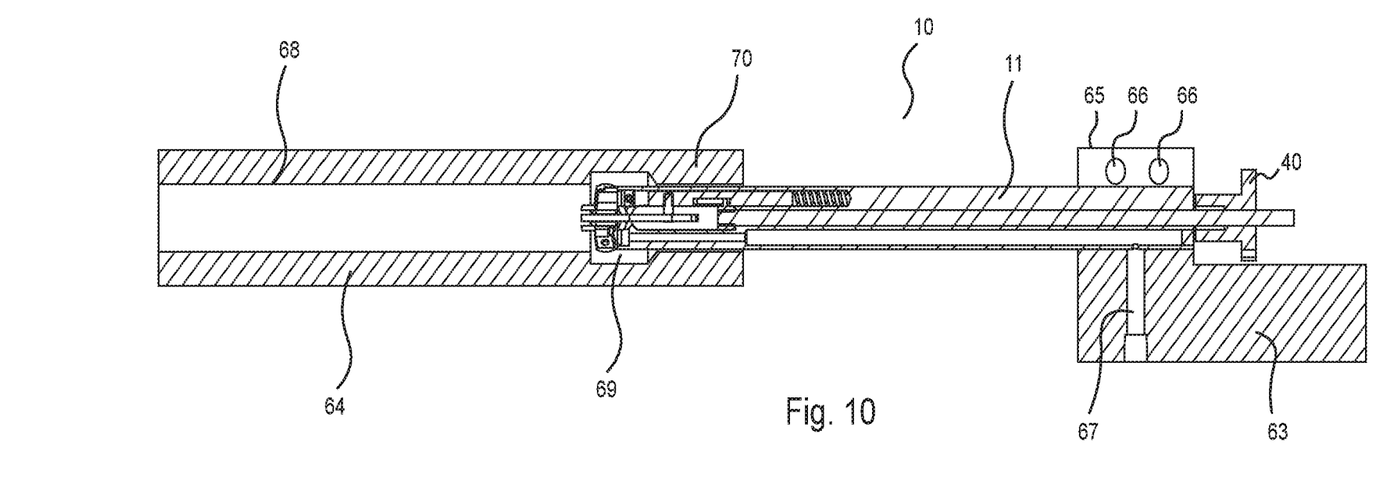
FIG. 10 is a section C-C through the mounted tool of FIG. 9.

In FIGS. 8 to 10 the boring tool 10 is illustrated in use with reference to a tool post assembly 63 adapted to be secured to a lathe bed toward the tailstock end and a rigging screw blank 64 mounted for rotation on the headstock main spindle (omitted for clarity). The tool post assembly 63 is entirely conventional for boring bars and comprises a split clamp upper portion 65 adapted to be clamped about the tool bar 11 by the action of clamping screws (not shown) through machine screw holes 66. A cutting fluid supply passage 67 is in register with the transverse drilling 19 to supply cutting fluid to the tool.

The rigging screw blank 64 has an initial bore 68 therethrough selected to admit the boring tool 10 in its stowed configuration. The rigging screw blank 64 is provided with an initial undercut portion 69 providing a space in which the boring tool 10 may transition from the stowed configuration to the deployed configuration. This undercut leaves a sleeve portion 70 ready to be internally threaded to accept turnbuckle terminals. Thereafter the rigging screw blank 63 may be spun up and the CNC leadscrew advanced to effect boring of the rigging screw barrel.

Apparatus in accordance with the foregoing embodiment has a cutting diameter of 23 mm, a cutting depth of 160 mm and can enter a bore of 17.5 mm. The tool is first clamped in the tool post of the lathe. With the tool in the stowed position the tool will enter the 17.5 mm hole advancing into a previously machined undercut 23.5 mm diameter×30 mm long. Within this chamber it can then be deployed. Then it is in position for cutting at a rate dictated by the cutting insert manufacturers data. The tool is then retracted into the pre-machined chamber, opened and retracted. The cutting head has the two cutting inserts slightly in advance of the two centring inserts which support the tool and keeps it stable.

The above embodiment represents close to the smallest preferred tool, given the engineering limitations of the small tool assembly. While smaller tools could be made, it is envisaged that an upper limit will be far greater than a 72 mm rigging screw, one of the largest made in the market.

Figures 11, 12:
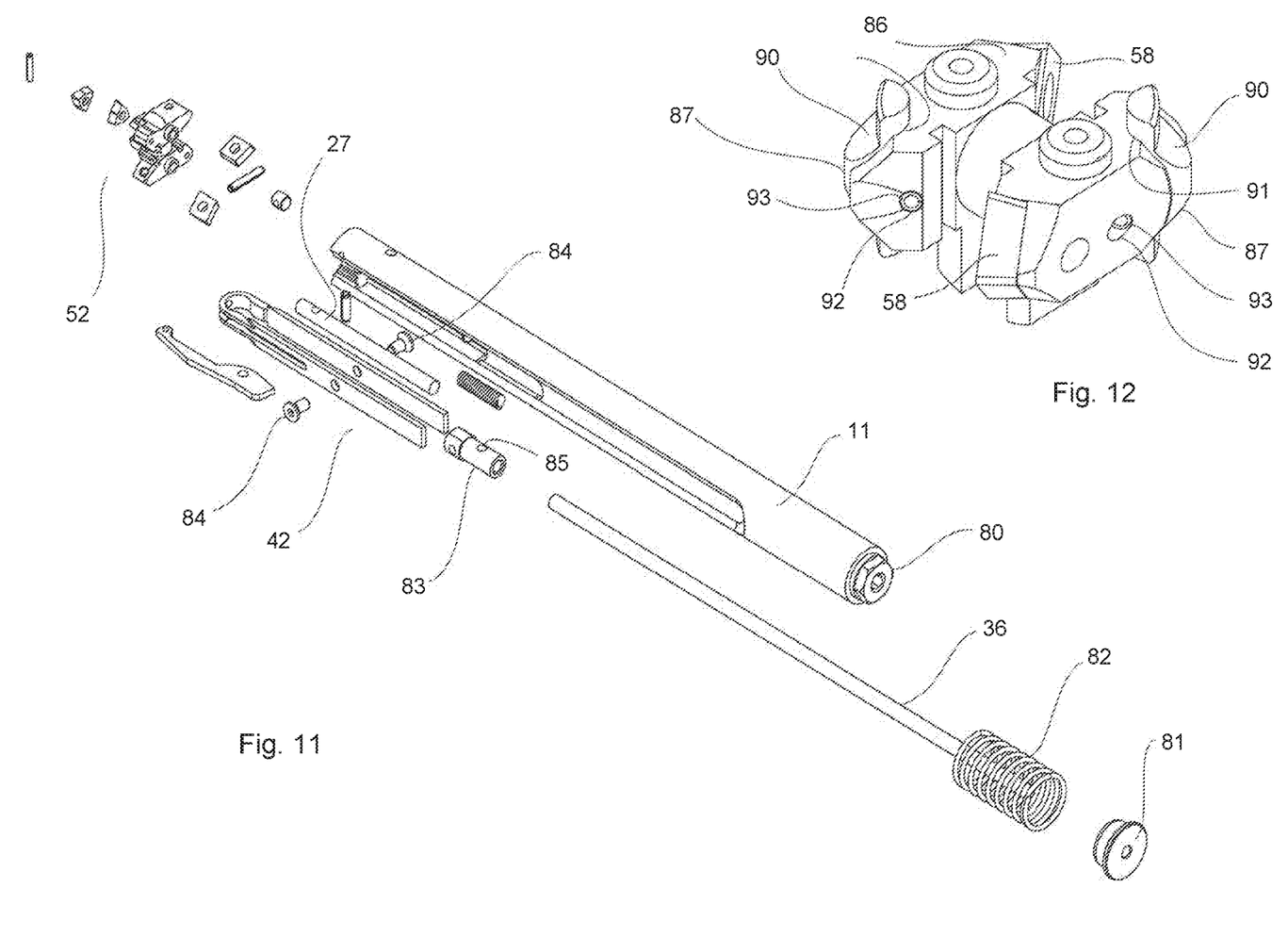
FIG. 11 is an exploded view of a further embodiment of an undercut extending tool.
FIG. 12 is an isometric view of an alternative cutter assembly of the present invention.

In the embodiment of FIG. 11, some optional variations in details are described. In this embodiment, the axial operating rod bore 14 which formerly passed from a mounting rear end 18 to intersect the receiver portion 12 milling is replaced by an oversize bore to an inner end that does not intersect the receiver portion 12. The inner end is line bored to pass the rod portion 36, the outer end portion of the rod portion 36 being supported and guided by hex head screw bush 80. The coolant passage counterbore 23 extends adjacent the receiver portion 12 to intersect the oversize bore to describe a generally Z-shaped coolant flow path. The coolant passage counterbore 23 may be selectively choked by driving a roll pin or a like tubular choke to regulate the coolant flow to the cutter though the hollow pin 61 or 62. The changes to the oversize bore and counterbore 23 make manufacture cheaper In addition, the thumb wheel 40 is replaced by a spring arrangement wherein the rod 36 is terminated at its outer end by a retaining bush 81 that functions as a locating cup for a spring 82, the other end of which bears on the end of the bar 11 around the hex bush 80. The spring action provides that the tool 52 is normally deployed with the spring at rest and stowing of the tool 52 is effected by pushing the retaining bush 81 toward the hex bush 80 against the bias of the spring 82.

The block 37 that coupled the rod 15 to both tool carrier 42 and the lost motion rod 27 in the previous embodiment is replaced by an M4-threaded coupling 83, which is easier to make. In consequence, the tool carrier 42 is secured to the coupling by CSK metal threads 84. The coupling 83 may engage the lost motion slot 33 via a roll pin or the like pressed into drilling 85.

FIG. 12 is a chamfer H-cutter usable on either of the foregoing embodiments. In this embodiment of the cutting tool, the generally H-shaped body 86 mounts cutting carbides 58 as before. However, the carbide centring (noncutting) inserts 60 of the prior cutter head are replaced by carbide wear inserts 87. These are formed by grinding from cylindrical stock to form reliefs 90 and a transverse arcuate groove (unseen). The body 86 is provided with arcuate open sided bores 91. These are intersected by drillings 92. The inserts 87 are slid axially into the bores until the arcuate grooves are aligned with the respective drillings and are retained by the insertion of spring (roll) pins 93. This cutter has the principal function of back chamfering, but it will bore also perfectly well, making it more versatile.

Figure 13:
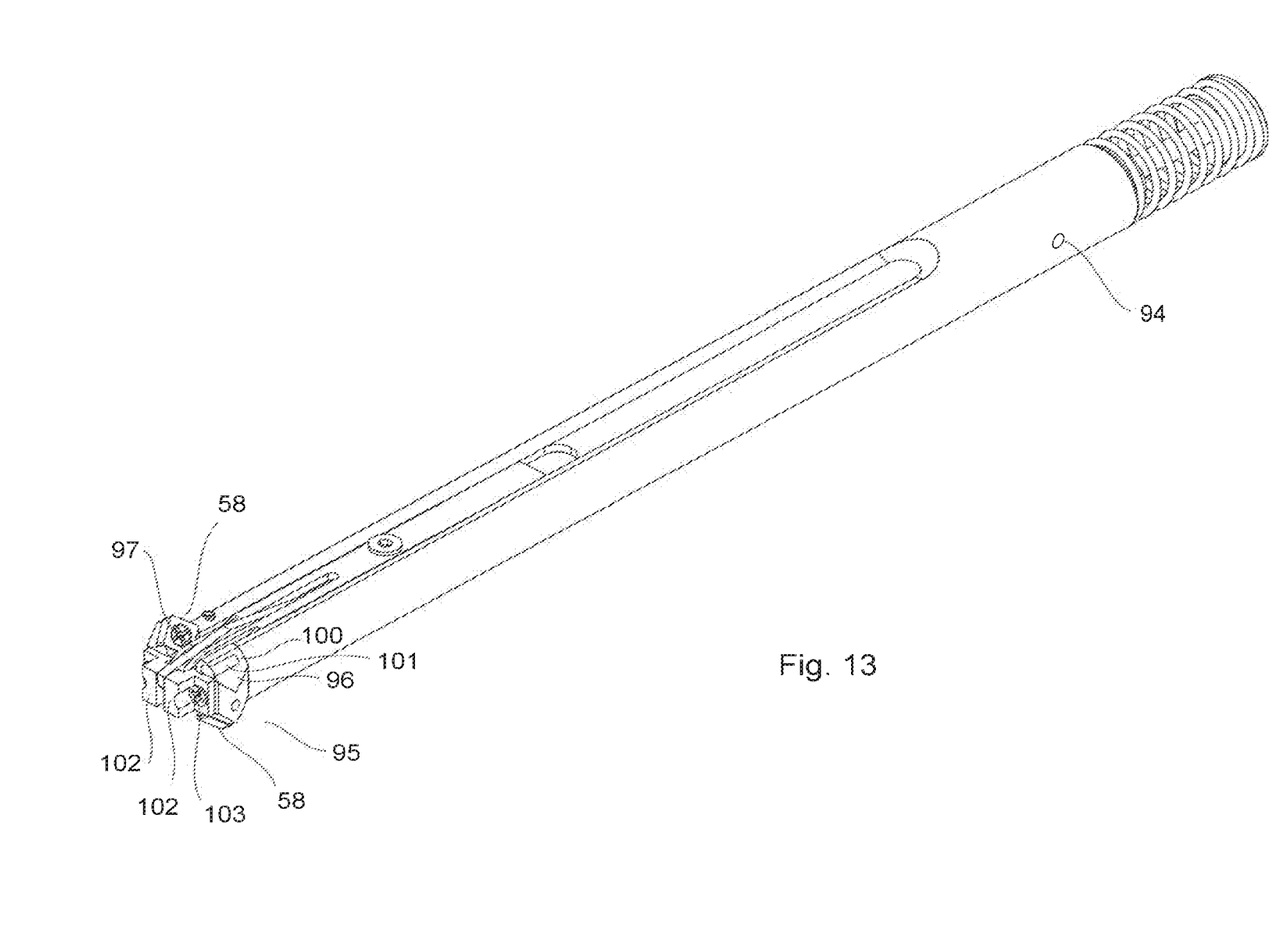
FIG. 13 is a further embodiment of the tool of the present invention.

FIG. 13 is a 16 mm embodiment (the previous embodiments are 23 mm), generally consistent with the embodiment of FIG. 11 and showing a coolant injection port 94. The cutter head 95 is a multicomponent arrangement whereby the H-cutter body 96 mounts cutter inserts 58 by means of M2.5×4 CSK metal threads 97. Part cylindrical blind bores 100 receive cylindrical-prism carbide wear inserts 101. The inserts 101 guide by bearing on the pilot drilling, as opposed to a "bore H cutter" wherein the inserts guide by bearing on the bore produced by the cutting inserts.

Figures 16, 17:
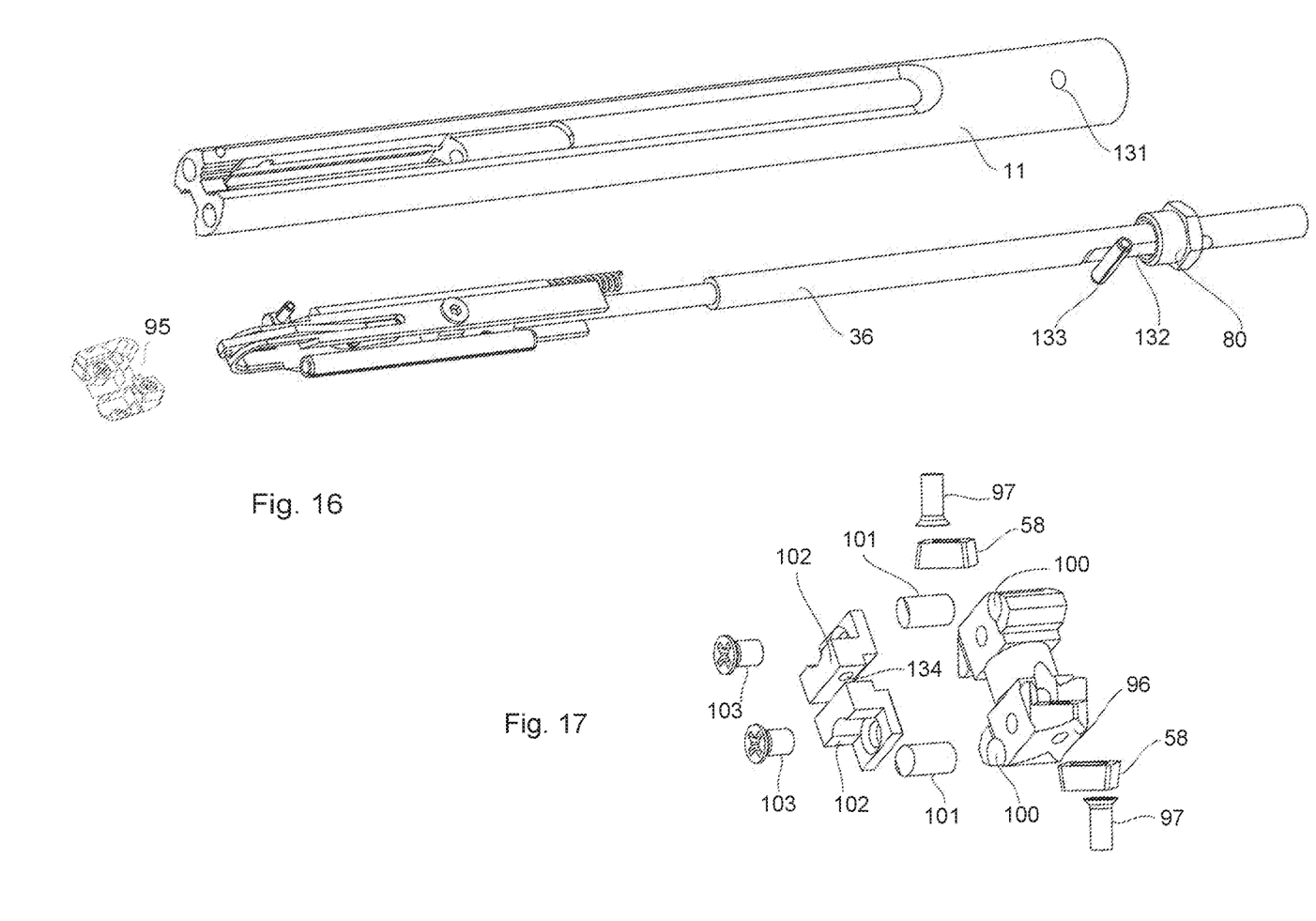
FIG. 16 is an exploded isometric view of a yet further embodiment of the present invention.
FIG. 17 is an exploded detail of the cutter assembly of the tool of FIG. 16.

L-brackets 102 replace the integral crank portions 54 and are assembled to the body 96 and trap and locate the crank pin 55 in recesses (seen in FIG. 17). The L-brackets 102 are secured to the body 96 by means of M2.5×4 CSK metal threads 103. In being so secured, the ends of the carbide wear inserts 101 are prevented from falling out of the blind bores 100.

This embodiment may be configured as a chamfer cutter, rough boring type or a spot facing type.

Figure 14:
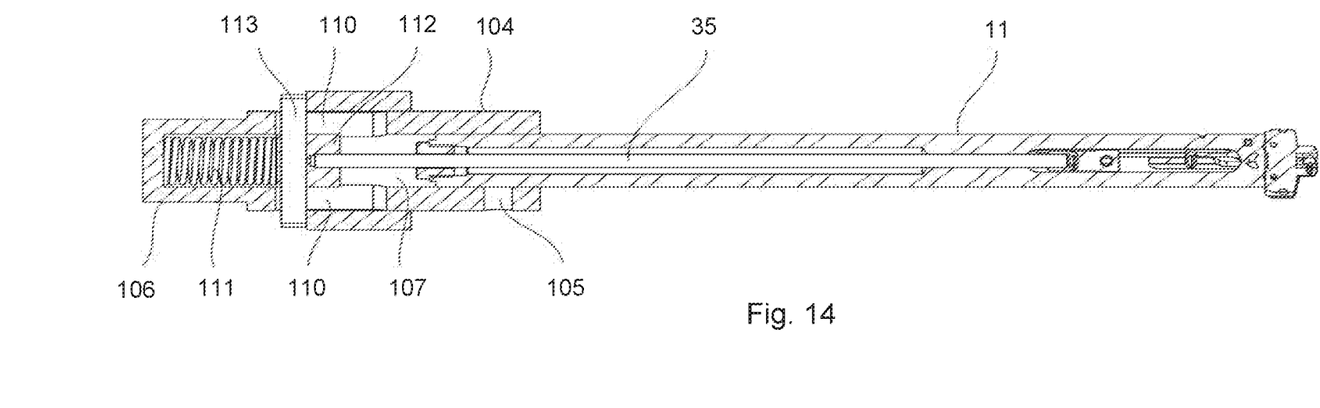
FIG. 14 is a longitudinal section of a manual mill actuator-operable tool of the present invention.

FIG. 14 illustrates a rotating boring tool for use in a vertical manual milling machine. In this embodiment the tool bar 11 is mounted to a chuck adapter 104 and secured by set screw in aperture 105. The back end 106 of the chuck adaptor 104 is configured to mount for rotation in the collet chuck of the milling machine.

The chuck adapter 104 has an axial bore 107 and a pair of opposed longitudinal slots 110 through the side wall thereof. The axial bore 107 contains a spring 111 adapted to bear on a spring follower 112 secured to the end of the operating rod assembly 35. The spring follower 112 is made captive by a spring (roll) pin 113 extending transversely through the follower 112 and the longitudinal slots 110 and serving to bias the cutting tool to the stowed position.

The chuck adapter 104 has a threaded outer surface on which is screwed a clamp nut 114 which may be hand rotated to bear on the end portions of the pin 113 to effect compression of the spring 111 and bias the cutting tool to the deployed position.

Figure 15:
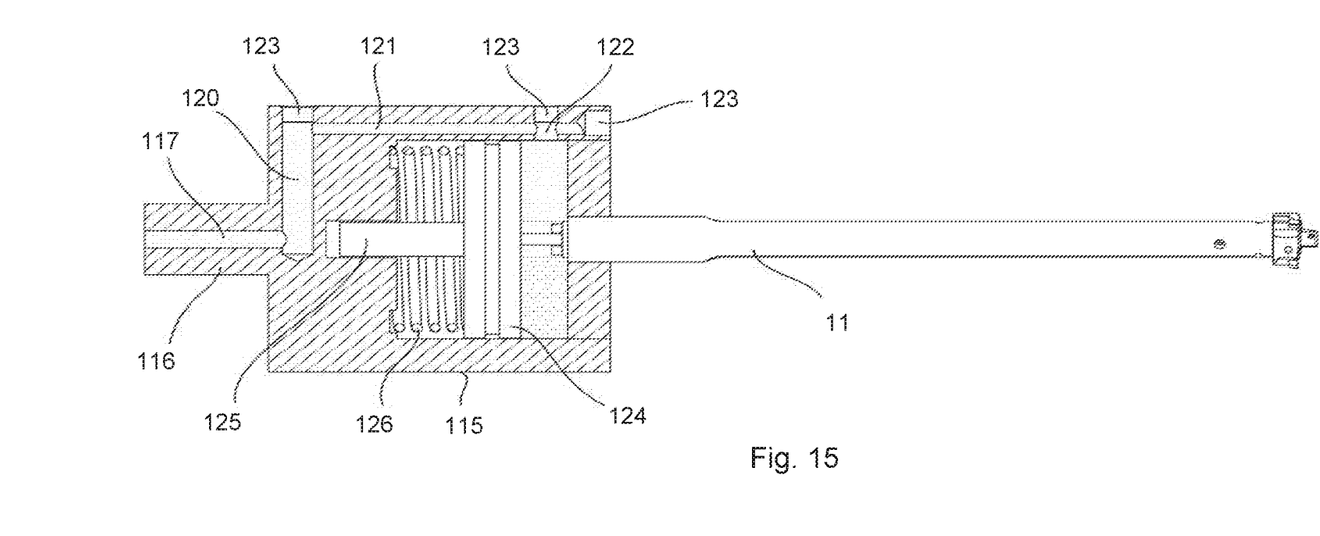
FIG. 15 is a collet held coolant operated tool according to the present invention.

FIG. 15 illustrates an alternative rotatable boring tool for a computerized machine which is hydraulically operated by the cutting fluid. The tool bar 11 in this embodiment is axially secured to one closed end of a cylinder 115, the other closed end of cylinder 115 being mounted for rotation in the machine by a spigot 116. The spigot 116 is connected to a pressurized coolant supply that passes by coaxial conduit 117 to a radial distributor 120 and axial conduit 121 to be ported into the cylinder at 122. The drillings defining the parts 120, 121 and 122 are sealed by plugs 123.

The operating rod assembly 35 is secured to and operable by a piston 124 in the cylinder 115 and stabilized by a guide rod 125. The piston 124 is biased to operate the operating rod assembly 35 to move the cutting tool toward the stowed position, by an axial spring 126 around the guide rod 125. Cutting fluid under pressure from the machine via the spigot 116 is delivered to the face of the piston 124 to oppose the bias and move the operating rod to move the cutting tool toward the deployed position for cutting. The pressure on the piston 124 is in effect a steady-state back pressure from the cutting tool end where it is used for lubrication and clearance.

FIGS. 16 and 17 in combination illustrate a generically mountable 16 mm tool associated with the cutting assembly of the embodiment of FIG. 13. FIG. 16 is a disassembled view consisting of the boring bar body 11, a tool operating assembly 127, and a cutter head 95. The cutter assembly 130 is represented in exploded view in FIG. 17.

The boring bar body 11 is substantially as described, including the internal bore adapted to be closed at the rear end by a hex bush 80. An off-diameter transverse drilling 131.

The tool operating assembly 127 is characterised by a stepped operating rod portion 36, having its thickest portion passing through the hex bush 80. The increase in section permits a relief 132 the ends of which define the limits of relative movement between the bar body 11 and the operating rod portion 36. The limits are enforced by a roll or spring pin 133 passed through the drillings 131 on assembly of the tool.

The cutter head 95 is a multicomponent arrangement whereby the H-cutter body 96 mounts cutter inserts 58 by means of M2.5×4 CSK metal threads 97. Part cylindrical blind bores 100 receive cylindrical-prism carbide wear inserts 101. The inserts 101 guide by bearing on the pilot drilling, as opposed to a "bore H cutter" wherein the inserts guide by bearing on the bore produced by the cutting inserts.

L-brackets 102 are assembled to the body 96 and trap and locate the crank pin 55 (not shown in this view) in recesses 134. The L-brackets 102 are secured to the body 96 by means of M2.5×4 CSK metal threads 103. In being so secured, the ends of the carbide wear inserts 101 are prevented from falling out of the blind bores 100.

It will of course be realised that while the above has been given by way of illustrative examples of this invention, all such and other modifications and variations thereto as would be apparent to persons skilled in the art are deemed to fall within the broad scope and ambit of this invention as is set forth in the claims appended hereto.

What is claimed is:

1. A boring tool comprising:
    a tool bar extending along a long axis;
    a tool carrier mounted at a tool mounting end of said tool bar and movable by an operating rod extending along said tool bar;
    a cutting tool pivotably mounted to said tool carrier about a mounting axis transverse said long axis and comprising at least a pair of arm portions each extending symmetrically away from said mounting axis to respective cutter portions;
    a crank connected to and configured to move said cutting tool between a deployed position having said cutter portions located substantially symmetric about said long axis and a stowed position having said cutter portions laying in a plane substantially aligned with said long axis;
    a complementary lug and recess associated with the cutting tool when in said deployed position and an end face of said tool mounting end and selectively engageable by movement of said tool carrier, said crank being operable by said operating rod via a lost motion link selected to force cutting tool stowing only after the complementary lug and recess disengage.

2. A boring tool according to claim 1, wherein the tool carrier comprises a generally fork-shaped, spring steel body having a pair of opposed, flat tines adapted to slidingly engage a pair of opposed complementary grooves milled into a side of the tool bar and extending from the mounting end.

3. A boring tool according to claim 2, wherein the fork shaped body comprises a bight that is milled or formed to provide a bushing surface for pivotally mounting the cutting tool.

4. A boring tool according to claim 3, wherein the operating rod passes through a longitudinal bore in the tool bar and terminates in a coupling adapted to slide in a channel milled through a floor of each of the complementary grooves, the coupling being secured to each of said flat tines.

5. A boring tool according to claim 4, wherein the cutting tool comprises an essentially bifurcated cutting tool body portion comprising a bifurcation, wherein:
    the pivotable mounting of the cutting tool to the tool carrier is located at the bifurcation; and
    the cutting tool body portion further comprises a plain bearing surface at the bifurcation, wherein the plain bearing surface is adapted to rotate in and relative to said bushing surface of the fork shaped body.

6. A boring tool according to claim 5, wherein the crank connected to and configured to move the cutting tool between the deployed position and the stowed position includes a crank pin connection to the cutting tool body portion that is substantially parallel to the mounting axis and spaced from it.

7. A boring tool according to claim 6, wherein the lost motion link comprises a slide having a longitudinal slot in which a lug associated with the coupling works, and a transverse pivot joint to the crank, the slide being spring biased toward the stowed position.

8. A boring tool according to claim 1, wherein the at least a pair of arm portions each extending symmetrically away from said mounting axis to respective cutter portions comprises a substantially H-shaped body portion, where a bar of the H-shaped body portion is pivotably mounted to the cutting tool and the arms of the H-shaped body portion form two respective, diametrically-opposed pairs of arms.

9. A boring tool according to claim 8, wherein a dimension of the cutting tool along the transverse axis is less than or as close as possible to less than a notional diameter of the tool bar.

10. A boring tool according to claim 1, wherein the cutting tool has cutting portions selected from integral cutting portions or cutting insert portions, the integral cutting portions or cutting insert portions being secured by one or more of screws, silver solder or other cementing means.

11. A boring tool according to claim 1, wherein the cutting portions are selected for counterboring, back chamfering, back spot facing, honing, machining or undercut boring.

12. A boring tool according to claim 8, wherein:
the two respective, diametrically-opposed pairs of arms includes a first opposed pair of arms and a second opposed pair of arms;
the first opposed pair of arms comprises primary cutting portions; and
the second opposed pair of arms are slightly offset to provide stability without cutting.

13. A boring tool according to claim 8, wherein:
the two respective, diametrically-opposed pairs of arms includes a first opposed pair of arms and a second opposed pair of arms;
the first opposed pair of arms comprises a lead pair for performing a first cut at a first diameter; and
the second opposed pair of arms is configured to cut to a finished dimension of the bore.

14. A boring tool according to claim 1, wherein the complementary lug and recess comprises a shaped spigot associated with a rear face of the cutting tool in the deployed position and a complementary shaped recess in the end face of the tool mounting end.

15. A boring tool according to claim 14, wherein the complementary lug comprises at least one steel locating stud adapted to locate in a recess comprising at least one complementary locating aperture, the at least one steel locating stud and the at least one complementary aperture being as far as is practicable from an axial centreline of the tool bar.

16. A boring tool according to claim 15, wherein said at least one steel locating stud comprises a first and second steel locating stud and the at least one complementary locating aperture comprises a first and second complementary locating aperture, the first steel locating stud and first complementary aperture forming a first spaced pair, and the second steel locating stud and second complementary aperture forming a second spaced pair.

17. A boring tool according to claim 15, wherein one or more of the at least one steel locating stud has a fluid passage therethrough, wherein the fluid passage is configured to communicate with a cutting fluid system to convey cutting fluid to passages in the cutting tool and thence to the cutting portions.

18. A boring tool according to claim 1, wherein the operating rod is configured to be secured in the deployed position by a thumb wheel or the like engaging a threaded end of the operating rod and reacting against an inner end of the tool bar.

19. A boring tool according to claim 1, wherein the tool bar is mounted in a fixed tool stand associated with a lathe adapted to rotate a workpiece mounted to a turning centre of the lathe.

20. A boring tool according to claim 1, wherein the tool bar includes a longitudinal passage for delivering cutting fluid to the tool mounting end of the tool bar.

21. A boring tool according to claim 20, further comprising a cylinder comprising a first end and a second end, wherein:
said tool bar is fixed to the first end of the cylinder, the second end of cylinder is mounted for rotation in a machine by a spigot;
the operating rod is configured to be secured to and operable by a piston in said cylinder,
biasing of the piston causes the operating rod to move said cutting tool toward the stowed position;
supplying said cutting fluid under pressure from said machine via said spigot to the face of the piston opposes said biasing of the piston and causes said operating rod to move said cutting tool toward said deployed position.

22. A boring tool according to claim 1, wherein:
the tool bar is mounted to a chuck adapter for rotation in the collet chuck of a milling machine;
the chuck adapter comprises an axial bore and a pair of opposed longitudinal slots through the side wall thereof;
the axial bore comprises a spring adapted to bear on a spring follower secured to an end of said operating rod;
the follower is configured to be made captive by a pin extending transversely through the follower and said pair of opposed longitudinal slots, and to bias said cutting tool to said stowed position;
the chuck adapter comprises a threaded outer surface on which is screwed a clamp nut; and
the clamp nut is adapted to be rotated by hand to bear on the ends of said pin to effect compression of said spring and bias said cutting tool to the deployed position.

23. A method of boring a workpiece mounted by one end for rotation on a live centre of a lathe and having a pilot bore therethrough and an expanded starter chamber formed in said pilot bore adjacent another end thereof, the method comprising:
providing a boring tool, the boring tool comprising:
a tool bar extending along a long axis;
a tool carrier mounted at a tool mounting end of said tool bar and movable by an operating rod extending along said tool bar;
a cutting tool pivotably mounted to said tool carrier about a mounting axis transverse said long axis and comprising at least a pair of arm portions each extending symmetrically away from said mounting axis to respective cutter portions;
a crank connected to and configured to move said cutting tool between a deployed position having said cutter portions located substantially symmetric about said long axis and a stowed position having said cutter portions laying in a plane substantially aligned with said long axis; and
a complementary lug and recess associated with the cutting tool when in said deployed position and an end face of said tool mounting end and selectively engageable by movement of said tool carrier, said crank being operable by said operating rod via a lost motion link selected to force cutting tool stowing only after the complementary lug and recess disengage;
clamping the boring tool in a lathe tool post;
inserting the boring tool through the pilot bore in to the expanded starter chamber;
operating the operating rod to cause the crank to rotate the cutting tool to the deployed position in the starter chamber and bring the cutting tool assembly back until the complementary lug and recess engage;

locking off the operating rod;

operating the lathe and advancing the lathe tool post to bore the workpiece;

stopping the lathe;

backing off the lathe tool post to partially withdraw the boring tool;

unlocking the operating rod;

advancing the operating rod until the complementary lug and recess disengage and the tool carrier advances the cutting tool pivot past the crank pin, rotating the cutting tool to the stowed position; and withdrawing the boring tool through the pilot bore.

* * * * *